United States Patent
Kim et al.

(10) Patent No.: US 7,330,548 B2
(45) Date of Patent: Feb. 12, 2008

(54) MOBILE TERMINAL AND SLIDING MODULE AND A METHOD THEREOF

(75) Inventors: Do-Hun Kim, Gumi-si (KR); Sung-Sun Park, Gumi-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 471 days.

(21) Appl. No.: 10/960,030

(22) Filed: Oct. 8, 2004

(65) Prior Publication Data

US 2005/0095928 A1 May 5, 2005

(30) Foreign Application Priority Data

Nov. 1, 2003 (KR) ...................... 10-2003-0077122

(51) Int. Cl.
*H04M 9/00* (2006.01)
(52) U.S. Cl. ............................. 379/433.12; 379/433.11
(58) Field of Classification Search ........... 379/428.01, 379/433.01, 433.04, 433.11–433.13; 345/168; 455/571.1, 575.4
See application file for complete search history.

(56) References Cited

U.S. PATENT DOCUMENTS 5,440,629 A  8/1995  Gray ..................... 379/433.12
2003/0103041 A1  6/2003  Nguyet et al. ............... 345/168
2004/0027335 A1  2/2004  Lin ............................ 345/168

FOREIGN PATENT DOCUMENTS

EP       1 051 012    11/2000
TW        557 050     10/2003

*Primary Examiner*—Curtis Kuntz
*Assistant Examiner*—Tuan Duc Nguyen
(74) *Attorney, Agent, or Firm*—Roylance, Abrams, Berdo & Goodman, LLP

(57) ABSTRACT

A mobile terminal comprising a main housing, first and second sub-housings, each slidably mounted on an upper surface of the main housing such that the first and second sub-housings can slide towards each other or away from each other to open or close a predetermined region of the upper surface of the main housing, and a sliding module. The mobile terminal is structured such that the display apparatus can be opened or closed by the first and second sub-housings, and such that it is easy to operate keypads with both hands when the display apparatus is open, resulting in convenience of playing games or chatting. Additionally, the sliding module of the mobile terminal is structured such that the first and second sub-housings are interlinked with each other, which allows for easy opening and closing of the display apparatus.

18 Claims, 7 Drawing Sheets

MOBILE TERMINAL AND SLIDING MODULE AND A METHOD THEREOF

PRIORITY

This application claims to the benefit under 35 U.S.C. §119(a) of an application entitled "MOBILE TERMINAL AND SLIDING MODULE THEREOF" filed in the Korean Intellectual Property Office on Nov. 1, 2003 and assigned Ser. No. 2003-77122, the entire contents of which are hereby incorporated by reference.

BACKGROUND OF THE INVENTION

1. Field of the Invention

The present invention relates to mobile terminals, such as cellular phones, PDAs (Personal Digital Assistants), HHPs (Handheld Phones), etc. More particularly, the present invention relates to a mobile terminal, which comprises a pair of sub-housings slidably movable on a main housing, and a sliding module of the mobile terminal and a method of sliding the sub-housings thereof.

2. Description of the Related Art

In general, the term "mobile terminal" means an electronic apparatus, which allows a user to perform wireless communication with others in a handheld state. Recently, mobile terminals have been designed to achieve miniaturization, slimness, and lighter weight to increase portability. Additionally, mobile terminals have been increasingly developed to support multimedia applications, which can provide various functions. Particularly, the mobile terminals have been both miniaturized and reduced in weight, as well as used for multi-function and multi-purpose applications. For example, the mobile terminals have been adapted to be appropriate for a variety of multimedia environments or Internet environments. Regardless of users' sex or age, mobile terminals are now used worldwide, and are viewed as a necessity of life, to be carried at all times.

Conventional mobile terminals can be classified into various types according to appearance. For instance, the mobile terminals can be classified into a bar-type terminal, a flip-type terminal, or a folder-type terminal according to their appearances. The bar-type terminal means a terminal having a bar-shaped single housing, the flip-type terminal means a terminal having a flip member rotatably coupled to the bar-shaped housing by a hinge member, and the folder-type terminal means a terminal having a folder rotatably coupled to the bar-shaped housing by a hinge member.

In addition to this classification, the conventional mobile terminals can be classified into a neck wearable type terminal and a wrist wearable type terminal according to how the terminal is worn, and can be classified into a rotational type terminal and a sliding type terminal according to the opening and closing method thereof. These mobile terminals, variously classified as mentioned above, can be easily understood by those skilled in the art of the present invention.

Meanwhile, in recent years, the mobile terminals have been developed to have a structure that allows high-speed data communication, as well as voice communication. That is, according to the increasing demands of users, the mobile terminals will be adapted to supply various services employing wireless communication technology that transmits data at high speed.

However, the conventional mobile terminal is provided with a restricted input means, for example, a keypad. Thus, when sending electronic mail or chatting, which requires the input of a great amount of data, characters must be input by means of keys, restricted in number on the keypad, thereby frequently causing inconvenience due to the need to press one key several times according to a shape of a letter. Furthermore, since the number of keys constituting the keypad is restricted, there is a problem in that users can only play games using the limited number of keys.

SUMMARY OF THE INVENTION

Therefore, the present invention has been made in view of the above-mentioned problems involved with the related art, and an object of the invention is to provide a mobile terminal with a pair of sub-housings slidably moving away in opposite directions, allowing an expanded keypad to be installed in the mobile terminal, and a sliding module of the mobile terminal.

In accordance with one aspect of the present invention, this object is accomplished by providing a sliding module for a mobile terminal comprising: a main housing; and first and second sub-housings, each slidably mounted on an upper surface of the main housing such that the first and second sub-housings can slide towards each other or away from each other to open and, therefore, uncover or close and, therefore, cover a predetermined region of the upper surface of the main housing, wherein the sliding module is provided with slide links, each being equipped on the main housing to slidably move thereon in a state that the slide links face each other and having one end fixed to one of the first and second sub-housings while being interlinked to the other slide link by means of a predetermined gear such that the one end of the slide link can move towards the other slide link or away therefrom.

In accordance with another aspect of the present invention, this object is accomplished by providing a mobile terminal comprising: a main housing having an opening, provided at the center of the main housing to allow a display apparatus to be equipped therein, and at least one pair of guide holes symmetrically elongated in a longitudinal direction at both sides of the opening centered on the opening while penetrating the main housing; first and second sub-housings, each being slidably mounted on an upper surface of the main housing with one or more guide protrusions linearly moving within the guide holes provided on one surface of each of the sub-housings, to slidably move towards the other sub-housing or away from the other sub-housing, thereby opening or closing the display apparatus equipped on the opening of the main housing; and at least one sliding module provided with slide links, each being equipped on an inside of the main housing to slidably move thereon in a state that the slide links face each other, and having one end fixed to the guide protrusions of the first or second sub-housing while being interlinked to the other slide link through a predetermined gear such that the one end of the slide link can move towards the other slide link or away from the other slide link.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENTS

Figure 1:
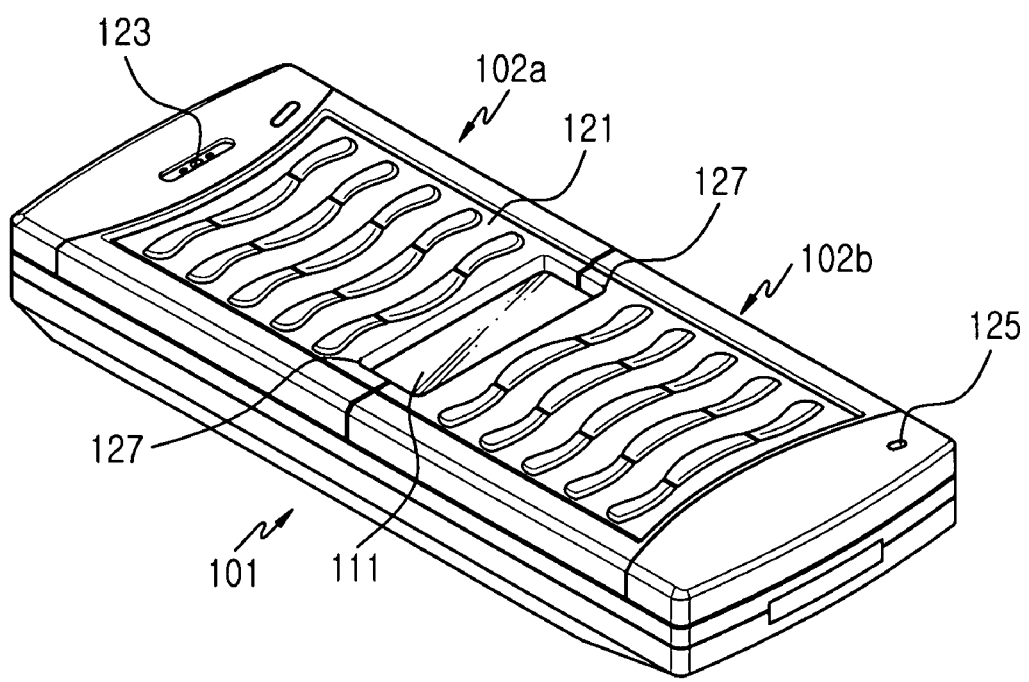
FIG. 1 is a perspective view illustrating a mobile terminal having a sliding module according to a preferred embodiment of the present invention.

Now, preferred embodiments of the present invention will be described in detail with reference to the annexed drawings. In the detailed description of the preferred embodiments, detailed illustration of the well-known functions or constructions related to the present invention will be omitted for conciseness.

Referring to FIGS. 1 to 5, a mobile terminal 100 having at least one sliding module 200 according to a preferred embodiment of the present invention comprises a main housing 101, and first and second sub-housings 102a and 102b, each being slidably mounted on the upper surface of the main housing 101, to slidably move on the upper surface of the main housing 101 towards or away from each other, thereby opening (uncovering) or closing (covering) a predetermined region of the upper surface of the main housing 101. The first and second sub-housings 102a and 102b are mounted on the main housing 101 by means of the sliding module 200. A display apparatus 111 is mounted on the upper surface of the main housing 101, which is opened (uncovered) or closed (covered) by the first and second sub-housings 102a and 102b.

The display apparatus 111 is mounted on the predetermined region of the upper surface of the main housing 101, specifically, on the center of the upper surface of the main housing 101. Accordingly, the main housing 101 is provided, at the center of the upper surface thereof, with an opening 113, shown in FIG. 3, to allow the display apparatus 111 to be equipped thereto. The opening 113 is provided, at both sides thereof, with at least one pair of guide holes 115 symmetrically elongated in the longitudinal direction. The guide holes 115 penetrate the main housing 101.

The first and second sub-housings 102a and 102b are equipped on the upper surface of the main housing 101 such that the first and second sub-housings 102a and 102b can slidably move towards each other or away from each other. Each of the first and second sub-housings 102a and 102b is formed, at one side thereof, with at least one guide protrusion 129. The guide protrusion 129 can linearly move within the corresponding guide hole 115, and has one end protruded towards an inner portion of the main housing 101. As each guide protrusion 129 of the first and second sub-housings 102a and 102b linearly moves within the corresponding guide hole 115, the first and second sub-housings 102a and 102b can slide on the upper surface of the main housing 101, respectively. Accordingly, when the first and second sub-housings 102a and 102b slide on the upper surface of the main housing 101, the predetermined region of the upper surface of the main housing 101, more specifically, the center of the main housing 101, on which the display apparatus is mounted, is opened or closed.

Figure 2:
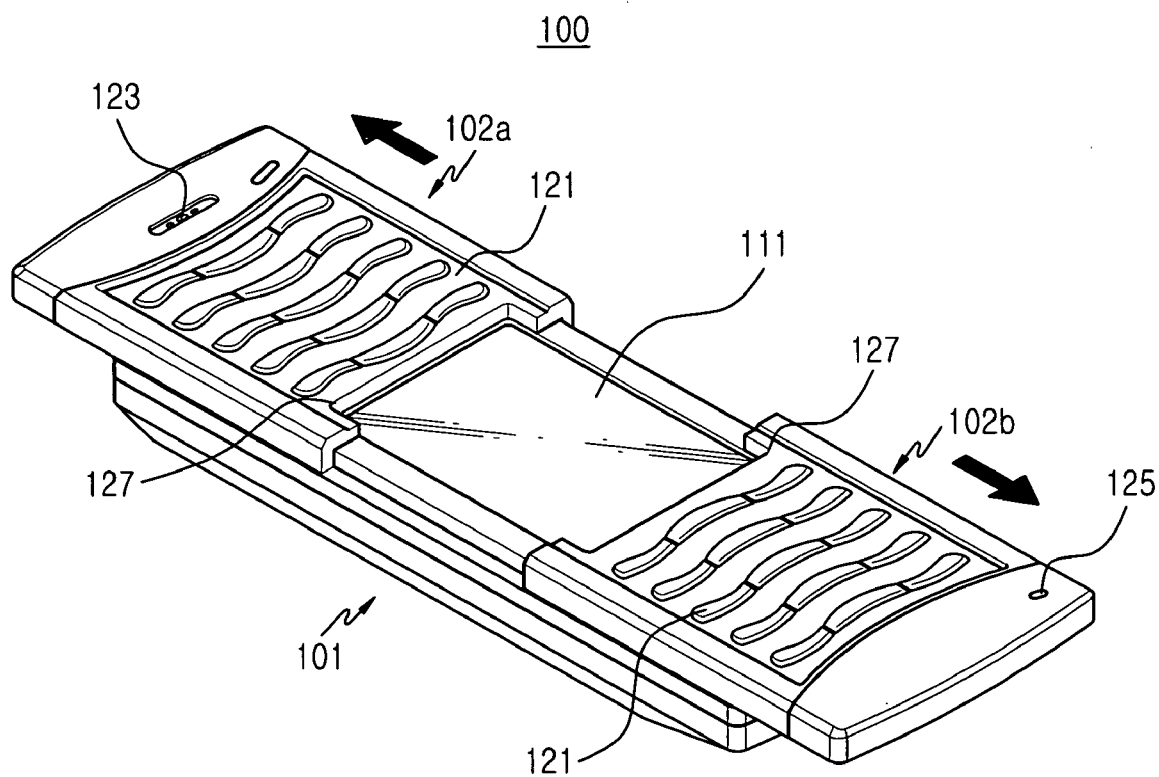
FIG. 2 is a perspective view illustrating the mobile terminal with a display apparatus opened by sub-housings of the mobile terminal shown in FIG. 1.

Each of the first and second sub-housings 102a and 102b is provided with a keypad 121 comprising a plurality of key buttons on the upper surface of each of the first and second sub-housings. Additionally, there are provided a receiver 123 having a speaker therein, and a sender 125 having a microphone therein at preferably separate locations on the upper surface of the first and second sub-housings 102a and 102b, respectively. Thus, users can conduct voice communication using the mobile terminal 100. In addition to the voice communication using the mobile terminal 100, the users can play games using the mobile terminal 100, after opening the display apparatus 111 by sliding the first and second sub-housings 102a and 102 away from each other. At this time, as shown in FIG. 2, since the display apparatus 111 is provided with the keypad 121 at either side thereof, the users can conveniently operate the mobile terminal 100 with both hands to play games or to chat.

Meanwhile, with the display apparatus 111 of the mobile terminal 100 closed, windows 127 for exposing some portion of the display apparatus 111 may be formed on the first and second sub-housings 102a and 102b, respectively. Accordingly, with the display apparatus 111 of the mobile terminal 100 closed, the display apparatus 111 is exposed by means of the windows 127, so that the users can conveniently confirm the current time, remaining capacity of battery, existence of newly received information, and the like.

The first and second sub-housings 102a and 102b are mounted on the main housing 101 by means of the sliding module 200.

Referring to FIGS. 3 to 7, the sliding module 200 is mounted at an inner portion of the main housing 101, and comprises a module housing 201, slide links 204a and 204b, and a sprocket 206.

Figure 6:
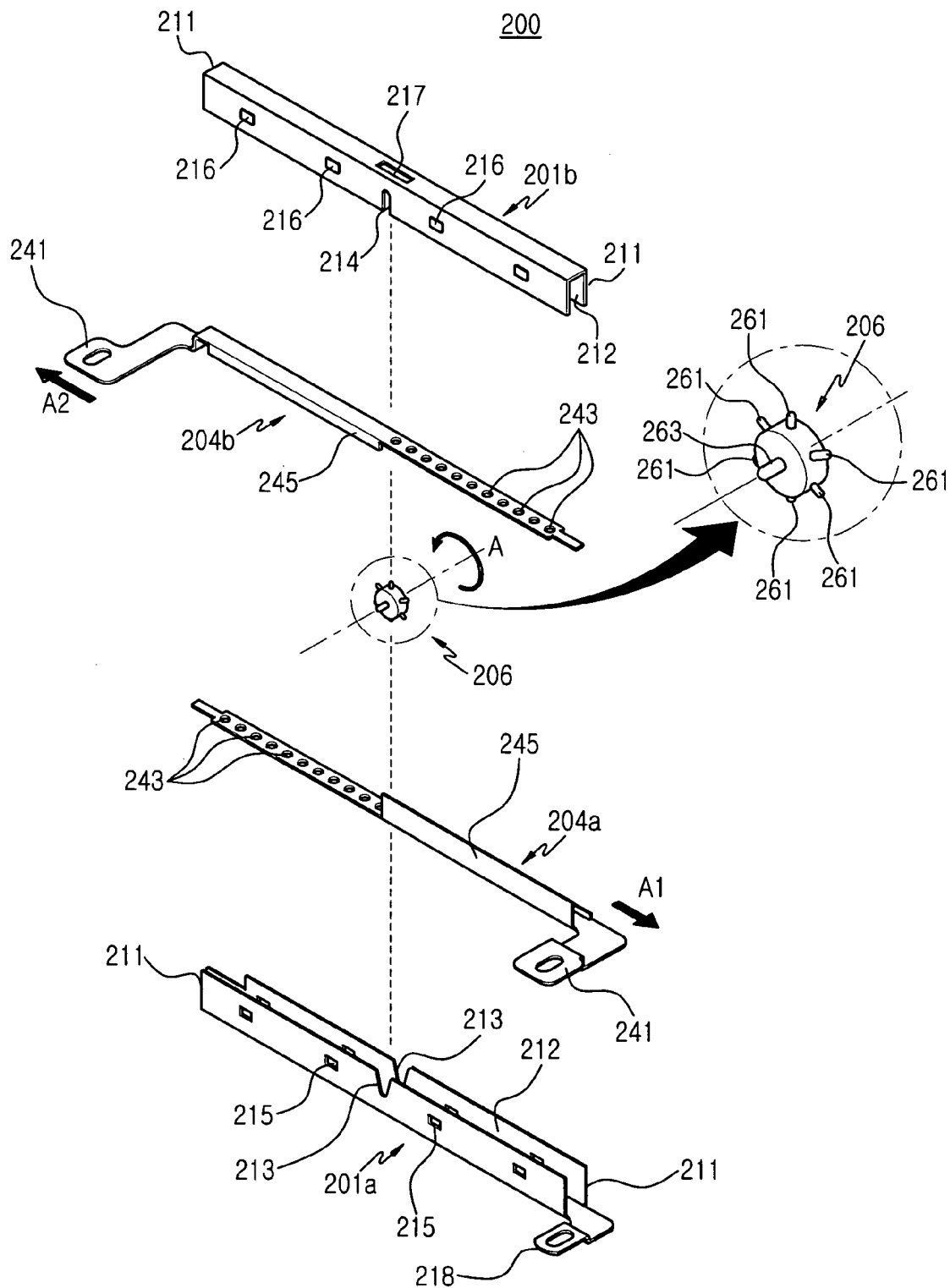
FIG. 6 is an exploded perspective view illustrating the sliding module of the mobile terminal shown in FIG. 3.
Figure 7:
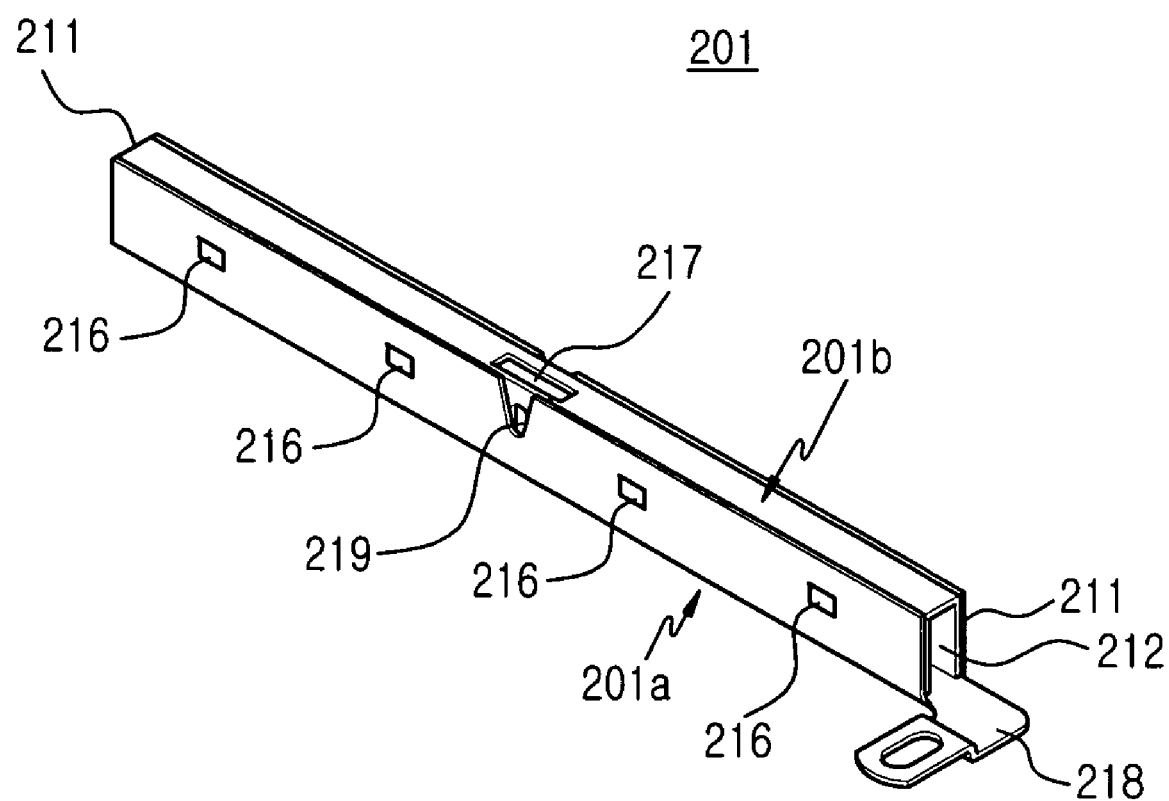
FIG. 7 is a perspective view illustrating a module housing of the sliding module shown in FIG. 6.

As shown in FIG. 7, the module housing 201 is extended in the longitudinal direction, and defines a receiving space 212, which is opened at both ends 211 of the receiving space 212. In view of manufacturability, the module housing 201 is extended in the longitudinal direction, and is constituted by assembling first and second covers 201a and 201b. At this time, as shown in FIG. 6, each of the covers 201a and 201b is opened at both ends 211 thereof and at one side facing the opened side of the other cover. That is, the first and second covers 201a and 201b are assembled to face each other, defining the receiving space 212 of the module housing 201 opened at both ends 211. The first and second covers 201a and 201b are formed with coupling holes 215 and coupling protrusions 216, respectively corresponding to the coupling holes 215 to be engaged with each other, on either side thereof, respectively. Accordingly, when assembling the first and second covers 201a and 201b to face each other, the coupling holes 215 and the coupling protrusions 216 are engaged with each other, thereby completing the assembly of the module housing 201. Additionally, the first and second covers 201a and 201b are formed with grooves 213 and 214 facing each other, respectively. When assembling the first and second covers 201a and 201b, the grooves 213 and 214 are engaged with each other, forming a rotating hole 219. The first cover 201a is formed at one end thereof with a fastening piece 218. The fastening piece 218 acts to fasten the module housing 201 to an inner portion of the main housing 101. Meanwhile, although the fastening piece 218 is provided as one component in the drawings, it is noted that the shapes and the number of fastening means to fasten the module housing 201 to the main housing 101 can be variously provided.

A pair of slide links 204a and 204b are provided to face each other within the module housing 201. Each of the slide links 204a and 204b is extended in the longitudinal direction, and is equipped within the module housing 201 such that the slide links 204a and 204b can be slidably moved within the module housing 201, and can be drawn from or input to the module housing 201 through both ends thereof. Each of the slide links 204a and 204b is formed at one end thereof with a fastening piece 241, and formed with a plurality of driving holes 243 uniformly spaced from the other end in the longitudinal direction. Additionally, each of the slide links 204a and 204b may be formed with a supporting piece 245, which is extended in the longitudinal direction while being supported on an inner wall of the module housing 201. Each fastening piece 241 of the slide links 204a and 204b is fastened to the one end of the corresponding guide protrusion 129 of each of the first and second sub-housings 102a and 102b. That is, the guide protrusion 129 is exposed to the inner portion of the main housing 101 through the guide hole 115 of the main housing 101, and is then fastened to the corresponding fastening piece 241 of each of the slide links 204a and 204b. Accordingly, when the user slides the first and second sub-housings 102a and 102b, the slide links 204a and 204b slide in the longitudinal direction of the module housing 201.

The sprocket 206 is rotatably mounted between the pair of slide links 204a and 204b, and is formed with a plurality of driving pins 261 uniformly spaced on an outer peripheral surface of the sprocket 206 to be engaged with the driving holes 243. Accordingly, when one of the slide links 204a is slidingly moved, the sprocket 206 is rotated corresponding to the sliding movement of the slide links 204a, causing the other slide link 204b to be slidingly moved. The sprocket 206 is formed with a rotating protrusion 263 at either side of the sprocket 206 such that the rotating protrusion 263 can be rotatably coupled to the rotating hole 219 of the module housing 201. In order to secure a moving space for the driving pins 261 of the sprocket 206 when the sprocket 206 is rotated, the module housing 201 is formed at upper and lower surfaces thereof with receiving holes 217, respectively.

That is, the pairs of slide links 204a and 204b are interlinked with each other by means of a gear constituted by the driving holes 243 and the sprocket 206 having the driving pins 261 formed thereon. When one of the sub-housings 102a and 102b is slidingly moved, one of the slide links 204a and 204b coupled to the corresponding guide protrusion 129 is also slidingly moved, thereby rotating the sprocket 206. When the sprocket 206 is rotated, the other slide link is slidingly moved according to a rotational direction of the sprocket 206, causing the other sub-housing to be rotated. For instance, as shown in FIG. 6, when a first slide link 204a provided at a lower side of the module housing 201 is moved in the direction of the arrow A1, the sprocket 206 is rotated in the counterclockwise direction A. As the sprocket 206 is rotated in the counterclockwise direction A, a second slide link 204b provided at an upper side of the module housing 201 is moved in the direction of the arrow A2. As a result, when the user slides one of the sub-housings 102a and 102b in the direction to open the display apparatus 111, the other sub-housing is also slidingly moved in the direction to open the display apparatus 111. Furthermore, the first and second sub-housings 102a and 102b are interlinked with each other, such that, when moving only one sub-housing, the other sub-housing can be moved, thereby realizing operation of closing the display apparatus 111.

Figure 3:
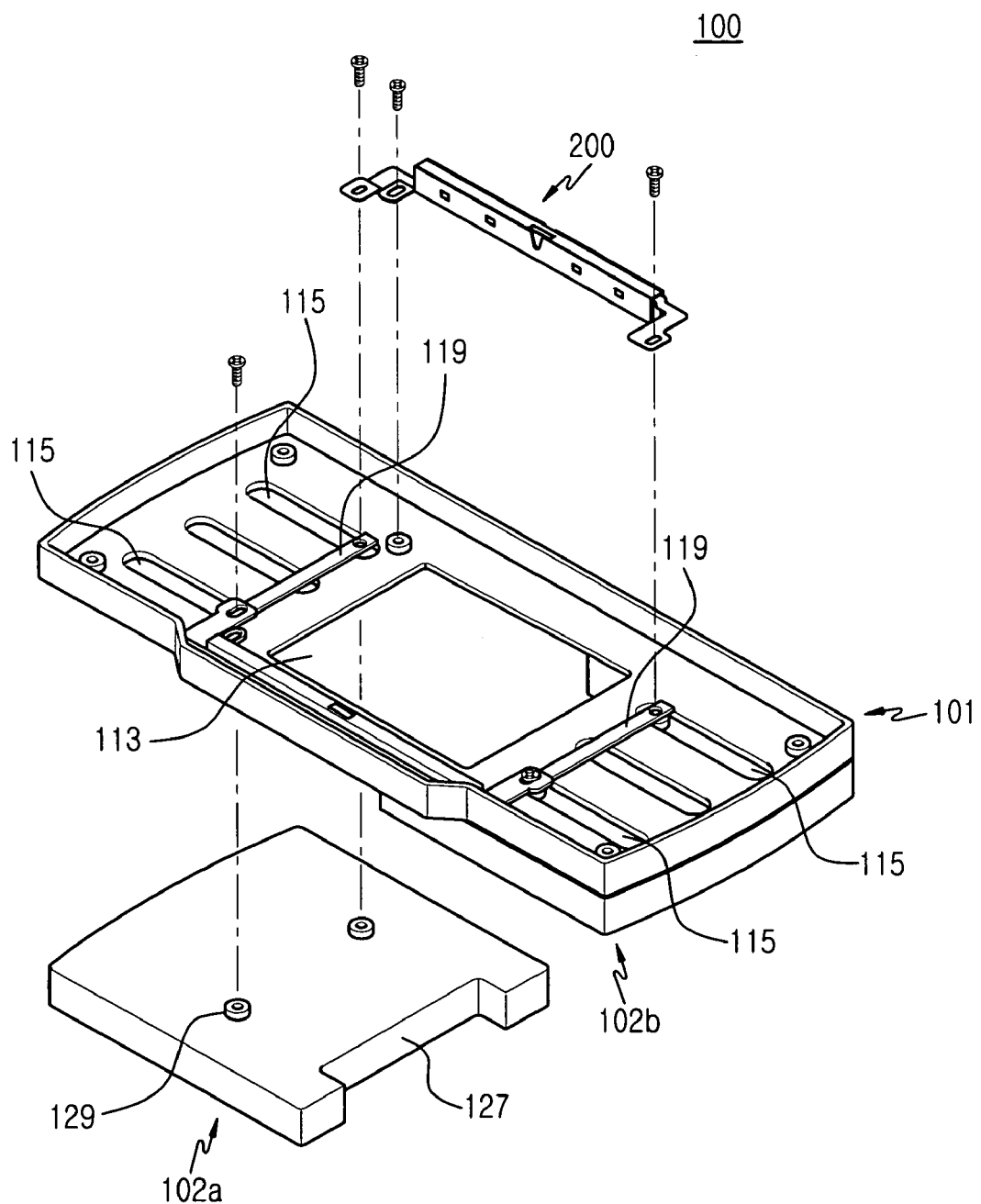
FIG. 3 is an exploded perspective view illustrating the mobile terminal shown in FIG. 1.
Figure 4:
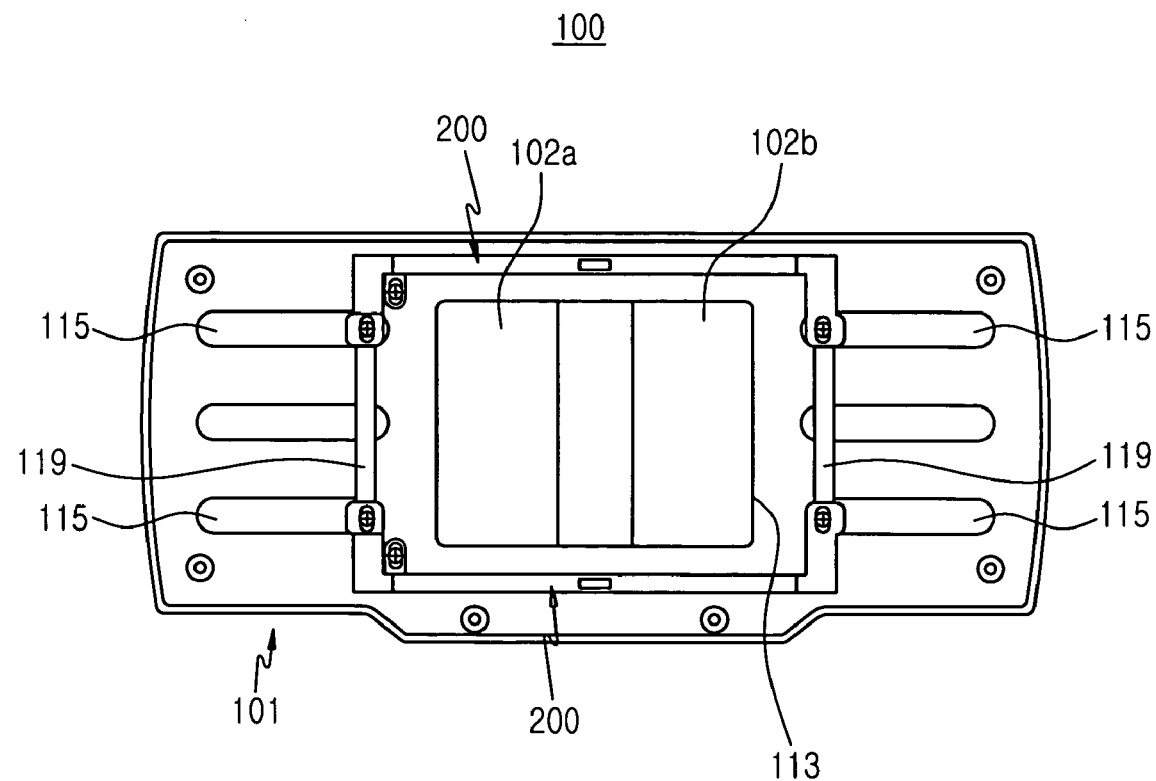
FIG. 4 is an inner plan view illustrating a closed or covered state of the mobile terminal shown in FIG. 3.
Figure 5:
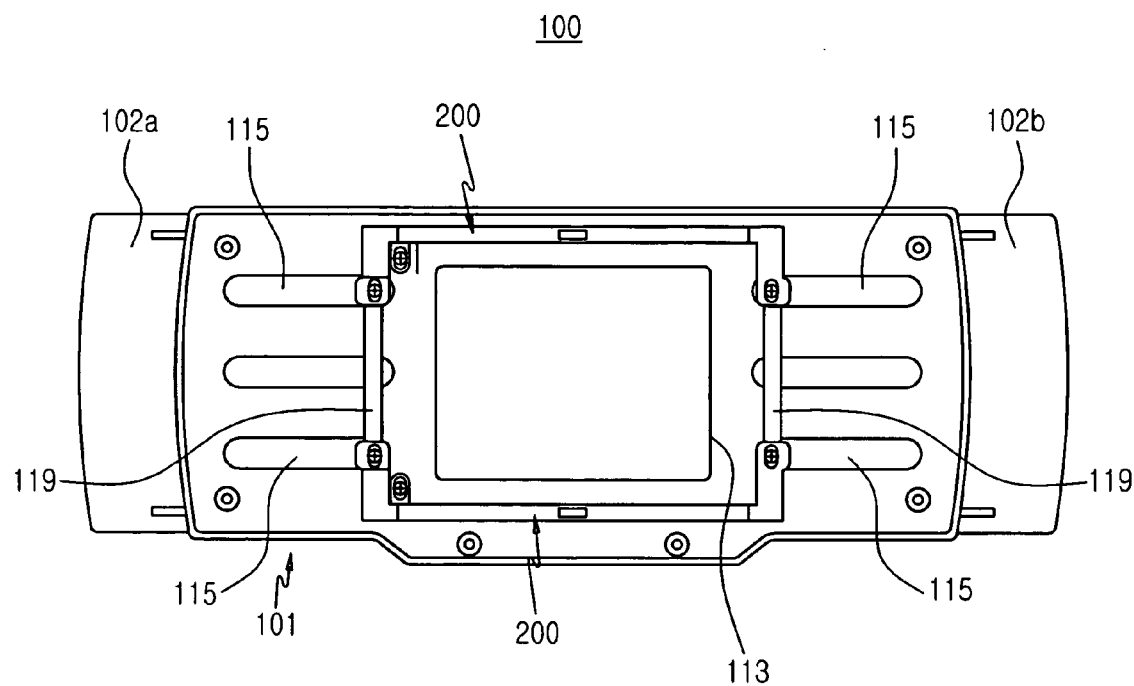
FIG. 5 is an inner plan view illustrating an opened or uncovered state of the mobile terminal shown in FIG. 3, in which the display apparatus is opened by the sub-housings of the mobile terminal.

The sliding module 200 constructed as described above is fastened to the inner portion of the main housing 101. Preferably, in order to ensure a stable opening and closing operation of the first and second sub-housings 102a and 102b, a pair of sliding module 200 may be symmetrically positioned at opposite edges of the openings 113. At this time, as shown in FIG. 3, the fastening pieces 241 of the slide links 204a and 204a; 204b and 204b, facing each other and symmetrically positioned at both sides of the openings 113, are fastened to supporting pieces 119, so that the fastening pieces 241 of the slide links 204a and 204a; 204b and 204b are connected to each other by means of each of the supporting piece 119.

As apparent from the description, the mobile terminal of the present invention is provided with the first and second sub-housings designed to slide on the main housing towards each other or away from each other to open or close the display apparatus, thereby allowing easy operation of the keypads provided at both sides of the display apparatus with both hands when the display apparatus is open, resulting in convenience of playing games or chatting. Additionally, the first and second sub-housings are interlinked with each other though the sliding modules, such that, when moving only one sub-housing, the other sub-housing can also be moved, thereby allowing easy opening closing of the display apparatus.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. A sliding module for a mobile terminal comprising:
    a main housing;
    first and second sub-housings, each slidably mounted on an upper surface of the main housing such that the first and second sub-housings can slide towards each other or away from each other to open or close a predetermined region of the upper surface of the main housing,
    wherein the sliding module is provided with,
    slide links, each being equipped on the main housing to slidably move thereon in a state that the slide links face each other, and having one end fixed to one of the first and second sub-housings while being interlinked to the other slide link by means of a predetermined gear such that the one end of the slide link can move towards the other slide link or away from the other slide link, and
    a module housing extended in the longitudinal direction and opened at both ends of the module housing such that the slide links can be drawn from or input to the module housing through both ends thereof.

2. The sliding module as set forth in claim 1, wherein each of the slide links is formed, at one end thereof, with a fastening piece fastened to the first or second sub-housing.

3. The sliding module as set forth in claim 1, wherein the gear comprises:
    a plurality of driving holes uniformly spaced from the other end of each of the slide links in a longitudinal direction; and
    a sprocket rotatably mounted between the pair of slide links, formed with a plurality of driving pins uniformly spaced on an outer peripheral surface of the sprocket to engage the driving holes, such that, when one of the slide links is slidingly moved, the sprocket is rotated corresponding to a sliding movement of the slide link, causing the other slide link to slidingly move.

4. The sliding module as set forth in claim 3, wherein the module housing is provided with first and second covers, each being extended in the longitudinal direction and defining a receiving space opened at both ends of the cover and at one side of the cover facing the opened side of the other cover, the first and second covers being coupled to each other in a state that the first and second covers face each other.

5. The sliding module as set forth in claim 3, wherein the sliding module is formed with rotating holes at the center of both sides thereof, and the sprocket is formed, at both sides thereof, with rotating protrusions supported by the rotating holes, respectively.

6. The sliding module as set forth in claim 3, wherein the module housing is further provided with one or more fastening pieces extended at a predetermined position and being formed with fastening holes, respectively.

7. The sliding module as set forth in claim 3, wherein each of the slide links is further provided with a supporting piece supported on an inner wall of the module housing.

8. The sliding module as set forth in claim 3, wherein the module housing is formed, at the center of both sides thereof, with receiving holes, each providing spaces to allow the driving pins of the sprocket to be rotated therein.

9. A mobile terminal, comprising:
a main housing having an opening, provided at the center of the main housing to allow a display apparatus to be equipped therein, and at least one pair of guide holes symmetrically elongated in a longitudinal direction at both sides of the opening centered on the opening while penetrating the main housing;
first and second sub-housings, each being slidably mounted on an upper surface of the main housing, with at least one guide protrusion linearly moving within the guide holes provided on one surface of each of the sub-housings, to slidably move towards the other sub-housing or away from the other sub-housing, thereby opening or closing the display apparatus equipped on the opening of the main housing; and
at least one sliding module provided with,
slide links, each being equipped on an inside of the main housing to slidably move thereon in a state that the slide link face the other slide link, and having one end fixed to the guide protrusion of the first or second sub-housing while being interlinked to the other slide link through a predetermined gear such that the one end of the slide link can move towards the other slide link or away from the other slide link, and
a module housing extended in the longitudinal direction and opened at both ends of the module housing such that the slide links can be drawn from or input to the module housing through both ends thereof.

10. The mobile terminal as set forth in claim 9, wherein a pair of sliding modules is symmetrically provided at opposites edges of the opening.

11. The mobile terminal as set forth in claim 9, wherein the gear comprises:

a plurality of driving holes uniformly spaced from the other end of each of the slide links in a longitudinal direction; and
a sprocket rotatably mounted between the pair of slide links, formed with a plurality of driving pins uniformly spaced on an outer peripheral surface of the sprocket to be engaged with the driving holes, such that, when one of the slide links is slidingly moved, the sprocket is rotated corresponding to a sliding movement of the slide link, causing the other slide link to be slidingly moved.

12. The mobile terminal as set forth in claim 9, wherein the module housing defines a receiving space opened at both ends of the receiving space and a pair of the slide links, each having a fastening piece fastened to the guide protrusion at one end of the slide link and a plurality of driving holes uniformly spaced in the longitudinal direction from the other end of the slide link, the sliding links being slidingly moved in a state that the sliding links face each other, so that the slide links can be drawn from or input to the module housing through both ends of the module housing.

13. The mobile terminal as set forth in claim 12, wherein the sliding module further comprises: a sprocket rotatably mounted between the slide links, formed with a plurality of driving pins uniformly spaced on an outer peripheral surface of the sprocket to be engaged with the driving holes, such that, when one of the slide links is slidingly moved, the sprocket is rotated corresponding to a sliding movement of the slide link, causing the other slide link to be slidingly moved.

14. The mobile terminal as set forth in claim 9, wherein a pair of sliding modules is symmetrically provided at opposite edges of the opening to face each other, and respectively comprise a pair of supporting pieces, each connecting respective facing ends of the sliding modules.

15. The mobile terminal as set forth in claim 9, wherein the first and second sub-housings are opened at some portion of one end thereof to provide facing windows, respectively, and some portion of the display apparatus is exposed through the windows in a closed state of the first and second sub-housings.

16. The mobile terminal as set forth in claim 9, wherein the guide protrusion protrudes into an inner portion of the main housing through the corresponding guide hole.

17. The mobile terminal as set forth in claim 9, wherein the first and second sub-housings are equipped with keypads on an upper surface thereof, respectively.

18. The mobile terminal as set forth in claim 9, further comprising a receiver having a speaker equipped at one end of one of the first and second sub-housings, and a sender having a microphone equipped at the other end of the other sub-housing.

* * * * *